United States Patent
Roberts et al.

(10) Patent No.: US 9,422,961 B1
(45) Date of Patent: Aug. 23, 2016

(54) CONNECTOR ELEMENT WITH PROTRUSION AND TANG FIXATION AND ASSOCIATED FRAME ASSEMBLY

(71) Applicant: Oddello Industries, LLC, Morristown, TN (US)

(72) Inventors: Thomas A. Roberts, Dandridge, TN (US); Shawn M. Parella, Morristown, TN (US)

(73) Assignee: Oddello Industries, LLC, Morristown, TN (US)

( * ) Notice: Subject to any disclaimer, the term of this patent is extended or adjusted under 35 U.S.C. 154(b) by 0 days.

(21) Appl. No.: 14/537,751

(22) Filed: Nov. 10, 2014

Related U.S. Application Data

(63) Continuation-in-part of application No. 29/477,795, filed on Dec. 27, 2013, now Pat. No. Des. 717,158.

(51) Int. Cl.
*F16B 12/46* (2006.01)
*F16B 12/44* (2006.01)

(52) U.S. Cl.
CPC ..................... *F16B 12/44* (2013.01)

(58) Field of Classification Search
CPC .... A47C 19/021; A47C 19/005; F16B 12/04; F16B 12/40; F16B 12/46; F16B 12/50; F16B 12/54; Y10T 403/4602; Y10T 403/555; A47B 88/0014
See application file for complete search history.

(56) References Cited

U.S. PATENT DOCUMENTS

| | | | | |
|---|---|---|---|---|
| 3,901,572 A * | 8/1975 | Litchfield | .......... | A47B 88/0014 312/111 |
| 3,989,397 A * | 11/1976 | Baker | .......... | F16B 12/02 403/205 |
| 4,002,261 A * | 1/1977 | Litchfield | .......... | A47B 88/0014 220/4.33 |
| 4,042,288 A * | 8/1977 | Litchfield | .......... | A47B 88/0014 160/381 |
| 4,099,815 A * | 7/1978 | Cox | .......... | A47B 88/0014 312/111 |
| 4,108,520 A * | 8/1978 | Litchfield | .......... | A47B 88/0014 312/111 |
| 4,162,114 A * | 7/1979 | Litchfield | .......... | A47B 88/0014 312/334.1 |
| 4,191,439 A * | 3/1980 | Cohen | .......... | A47B 88/0014 312/111 |
| 4,279,455 A * | 7/1981 | Santo | .......... | A47B 88/00 312/140 |
| 4,303,289 A * | 12/1981 | Hardy | .......... | F16B 12/50 312/140 |
| 4,664,349 A * | 5/1987 | Johansen | .......... | B67D 3/00 248/150 |
| 5,115,895 A * | 5/1992 | Myers | .......... | A45C 5/14 190/123 |
| 5,144,780 A * | 9/1992 | Gieling | .......... | E04B 1/5831 135/114 |
| 5,944,439 A * | 8/1999 | Ellsworth | .......... | A47B 47/025 211/90.01 |
| 7,703,155 B1 * | 4/2010 | Roberts | .......... | A47C 19/005 403/231 |
| 7,900,300 B1 * | 3/2011 | Roberts | .......... | A47C 19/005 403/231 |
| 8,122,537 B1 * | 2/2012 | Roberts | .......... | A47C 19/005 403/231 |

* cited by examiner

*Primary Examiner* — Daniel Wiley
(74) *Attorney, Agent, or Firm* — Shaddock Law Group, PC

(57) ABSTRACT

A connector element having a body portion formed by a first abutment surface, a second abutment surface, and a corner surface, wherein the first abutment surface and the second abutment surface are formed at substantially 90° relative to one another; wherein a first portion of the first abutment surface extends from a substantially planar bottom surface to a substantially planar deck panel support surface and wherein a second portion of the first abutment surface extends from the bottom surface above the deck panel support surface; wherein a first portion of the second abutment surface extends from the bottom surface to the deck panel support surface and wherein a second portion of the second abutment surface extends from the bottom surface above the deck panel support surface; and one or more substantially dowel-shaped protrusions extend perpendicularly from the first abutment surface and the second abutment surface.

18 Claims, 20 Drawing Sheets

US 9,422,961 B1

CONNECTOR ELEMENT WITH PROTRUSION AND TANG FIXATION AND ASSOCIATED FRAME ASSEMBLY

CROSS-REFERENCE TO RELATED APPLICATIONS

This patent application claims priority to U.S. patent application Ser. No. 29/477,795, filed Dec. 27, 2013, the entire disclosure of which is incorporated herein by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE INVENTION

1. Field of the Invention

The present invention relates generally to the field of foundation assemblies. In particular, the present invention relates to improved connector elements, foundation assemblies, and a method for constructing foundation assemblies.

2. Description of Related Art

Typically, foundations and bases are constructed by hand from various pieces of pine or other lightweight woods. These built-up foundations are formed in a generally rectangular fashion and are sometimes sawed at each corner in an effort to replicate the rounded corners of conventional mattresses.

Various external jigs and fixtures must be used in order to assemble the numerous components of the foundations. Once aligned, the various pieces or components are typically nailed together.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE INVENTION

However, constructing foundations using known methods is typically time-consuming, requires relatively skilled workers, requires numerous components and tools, and does not always result in a secure or square foundation. Even with the introduction of certain improved connector elements, assembly typically still requires use of screws or nails to hold the various components of the foundation assembly together.

Thus, the present invention relates generally to improved foundation assemblies. In particular, the present invention relates to improved connector elements, foundation assemblies, and a method for constructing a foundation assembly.

In various exemplary embodiments, the foundation assembly of the present invention is constructed of Medium Density Fiberboard (MDF) and/or plastic components. The overall part count is significantly lower than that of other foundations. This low parts count greatly reduces the number of contact points between components in the assembly, and virtually eliminates the potential for bothersome squeaks caused by friction.

In various exemplary embodiments, the foundation assembly comprises four shaped perimeter rails (first and second, opposing side rail elements and first and second, opposing header elements), joined to four connector elements. The profile of the perimeter rails provides smooth, rounded, horizontal outer edges, and includes a recessed notch to accommodate a flush-mounted deck panel.

In various exemplary, non-limiting embodiments, the connector elements comprise a body portion formed by a substantially planar first abutment surface, a substantially planar second abutment surface, and a corner surface. The first abutment surface extends to a first terminating edge and the second abutment surface extends to a first terminating edge. The first abutment surface and the second abutment surface are formed at substantially 90° relative to one another, and wherein the corner surface extends between the first terminating edge of the first abutment surface and the first terminating edge of the second abutment surface.

A first portion of the first abutment surface extends from a substantially planar bottom surface to a substantially planar deck panel support surface and a second portion of the first abutment surface extends from the bottom surface above the deck panel support surface.

A first portion of the second abutment surface extends from the bottom surface to the deck panel support surface and a second portion of the second abutment surface extends from the bottom surface above the deck panel support surface.

A first deck panel corner abutment surface extends substantially perpendicularly from a first terminating edge of the deck panel support surface between the first portion of the first abutment surface and the second portion of the first abutment surface.

A second deck panel corner abutment surface extends substantially perpendicularly from a second terminating edge of the deck panel support surface between the first portion of the second abutment surface and the second portion of the second abutment surface.

In various exemplary, non-limiting embodiments, the first deck panel corner abutment surface and the second deck panel corner abutment surface are formed at substantially 90° relative to one another. One or more substantially dowel-shaped protrusions extend perpendicular to the first abutment surface and one or more substantially dowel-shaped protrusions extend perpendicular to the second abutment surface.

At least one first deflectable flexible finger extends from the first abutment surface. At least a portion of a primary surface of the at least one first deflectable flexible finger extends substantially perpendicular to the first abutment surface, and wherein the at least one first deflectable flexible finger comprises a tang that extends, proximate a tip of the at least one first deflectable flexible finger, beyond the primary surface of the at least one first deflectable flexible finger.

At least one, optional second deflectable flexible finger extends from the first abutment surface. At least a portion of a primary surface of the at least one second deflectable flexible finger extends substantially perpendicular to the second abutment surface, and wherein the at least one second deflectable flexible finger comprises a tang that extends, proximate a tip of the at least one second deflectable flexible finger, beyond the primary surface of the at least one second deflectable flexible finger.

In various exemplary, nonlimiting embodiments, the connector element of the present invention also includes a first side support shoulder that extends perpendicular to the first abutment surface, proximate the bottom surface and a second side support shoulder that extends perpendicular to the second abutment surface, proximate the bottom surface.

In various exemplary, nonlimiting embodiments, the connector element of the present invention also includes a substantially planar first side surface and a substantially planar second side surface. At least a portion of the first side surface extends substantially perpendicular to the first abutment surface and at least a portion of the second side surface extends substantially perpendicular to the second abutment surface. The first side surface and the second side surface are formed at substantially 90° relative to one another, the primary surface of the at least one first deflectable flexible finger is substantially parallel to the first side surface, and the primary surface of the at least one second deflectable flexible finger is substantially parallel to the second side surface.

Aesthetically, the connector elements serve to round the vertical outer edges of the foundation assembly, while maintaining the radii of the foundation assembly's top and bottom edges. Structurally, the connector elements provide substantial impact resistance to corner loading and flexible resistance to parallelogram deformation.

The deck panel is typically a sheet of thinner MDF, or other material, which provides a single, solid surface upon which the mattress will sit. A solid deck panel is particularly critical for foam mattresses, for example, and is a major improvement over currently constructed foundations, which use soft cardboard atop lumber slats.

In various exemplary embodiments, elements of the foundation assembly may optionally be fastened together with adhesives, if desired. Alternatively, screws or other fasteners may optionally be used, but are not necessary, to assemble the elements of the foundation. In still other embodiments, both adhesive and screws or other fasteners may be used.

Accordingly, this invention provides a foundation assembly of improved design.

This invention separately provides a foundation assembly having a lower overall part count when compared to other foundations.

This invention separately provides a foundation assembly having improved structural stability.

This invention separately provides a foundation assembly that can be assembled without the need for external jigs and/or fixtures.

This invention separately provides a foundation assembly that can be scaled to accommodate any desired size or dimension.

This invention separately provides a foundation assembly that is less expensive to manufacture.

This invention separately provides a foundation assembly that can be held together without the use of nails, screws, fasteners, or adhesives.

This invention separately provides a connector element of improved design.

This invention separately provides a connector element that allows for assembly of foundation components without the use of tools.

This invention separately provides a scalable connector element.

This invention separately provides a connector element that is relatively lightweight.

This invention separately provides a connector element that can be produced in mass quantity from plastic, wood, or other any other suitable material.

These and other aspects, features, and advantages of the present invention are described in or are apparent from the following detailed description of the exemplary, non-limiting embodiments of the present invention and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

Any benefits, advantages, or solutions to problems that are described herein with regard to specific embodiments are not intended to be construed as a critical, required, or essential feature(s) or element(s) of the present invention or the claims.

BRIEF DESCRIPTION OF THE SEVERAL VIEWS OF THE DRAWINGS

As required, detailed exemplary embodiments of the present invention are disclosed herein; however, it is to be understood that the disclosed embodiments are merely exemplary of the invention that may be embodied in various and alternative forms, within the scope of the present invention. The figures are not necessarily to scale; some features may be exaggerated or minimized to illustrate details of particular components. Therefore, specific structural and functional details disclosed herein are not to be interpreted as limiting, but merely as a basis for the claims and as a representative basis for teaching one skilled in the art to employ the present invention.

The exemplary embodiments of this invention will be described in detail, with reference to the following figures, wherein like reference numerals refer to like parts throughout the several views, and wherein.

DETAILED DESCRIPTION OF THE INVENTION

Figure 1:
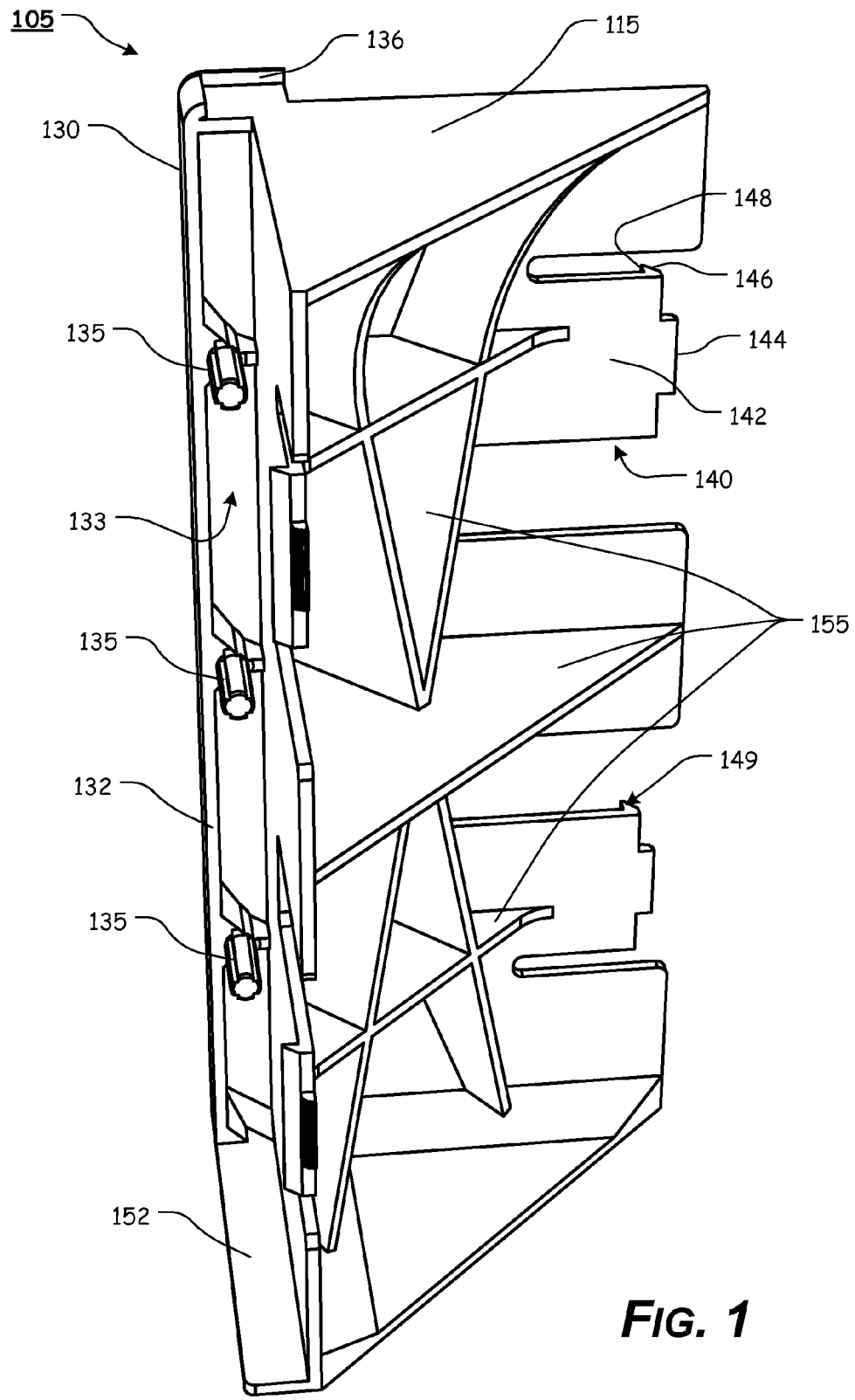
FIG. 1 illustrates an upper, left perspective view of a first exemplary embodiment of a connector element according to this invention.
Figure 2:
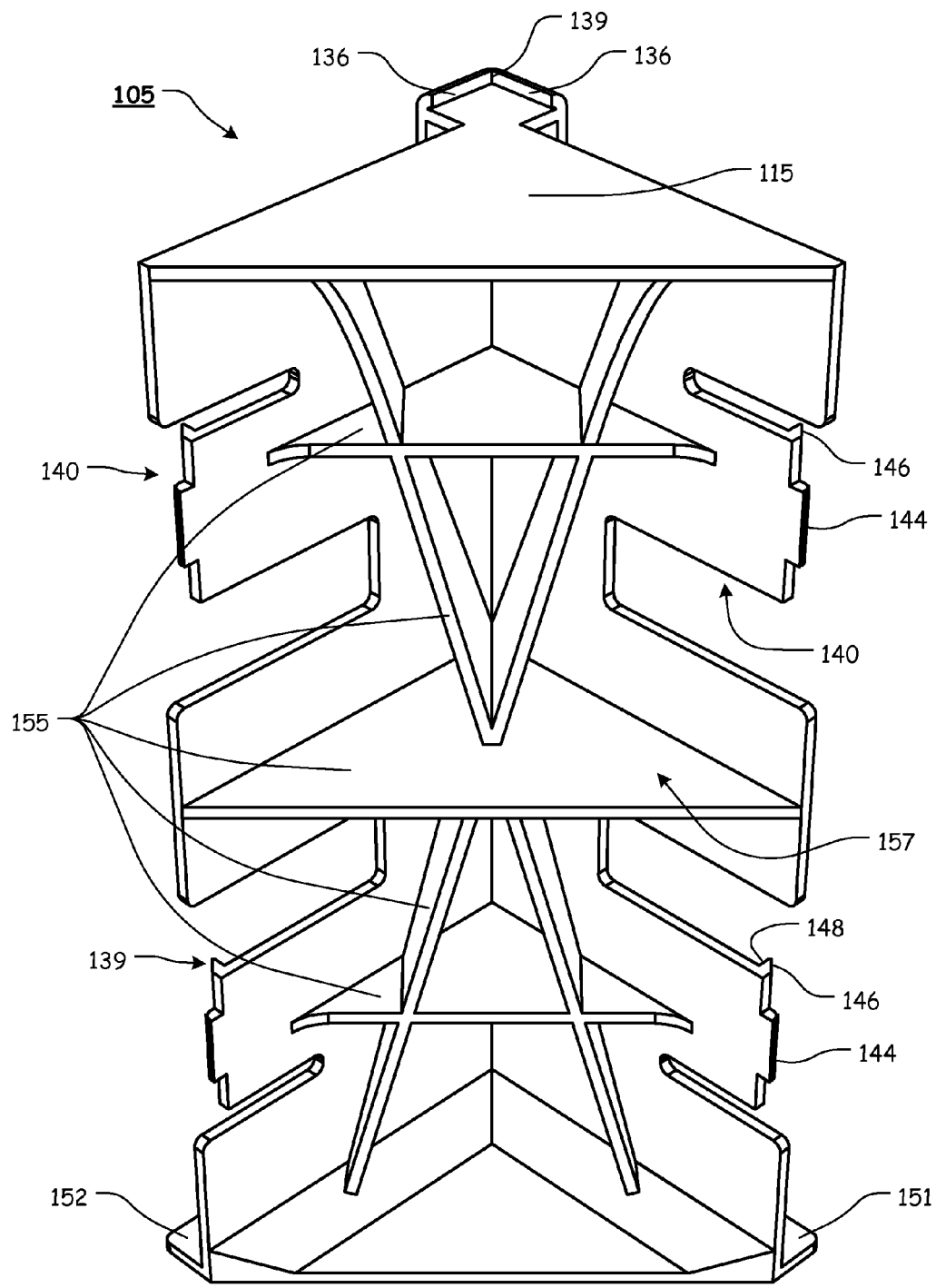
FIG. 2 illustrates an upper, front perspective view of a first exemplary embodiment of a connector element according to this invention.
Figure 3:
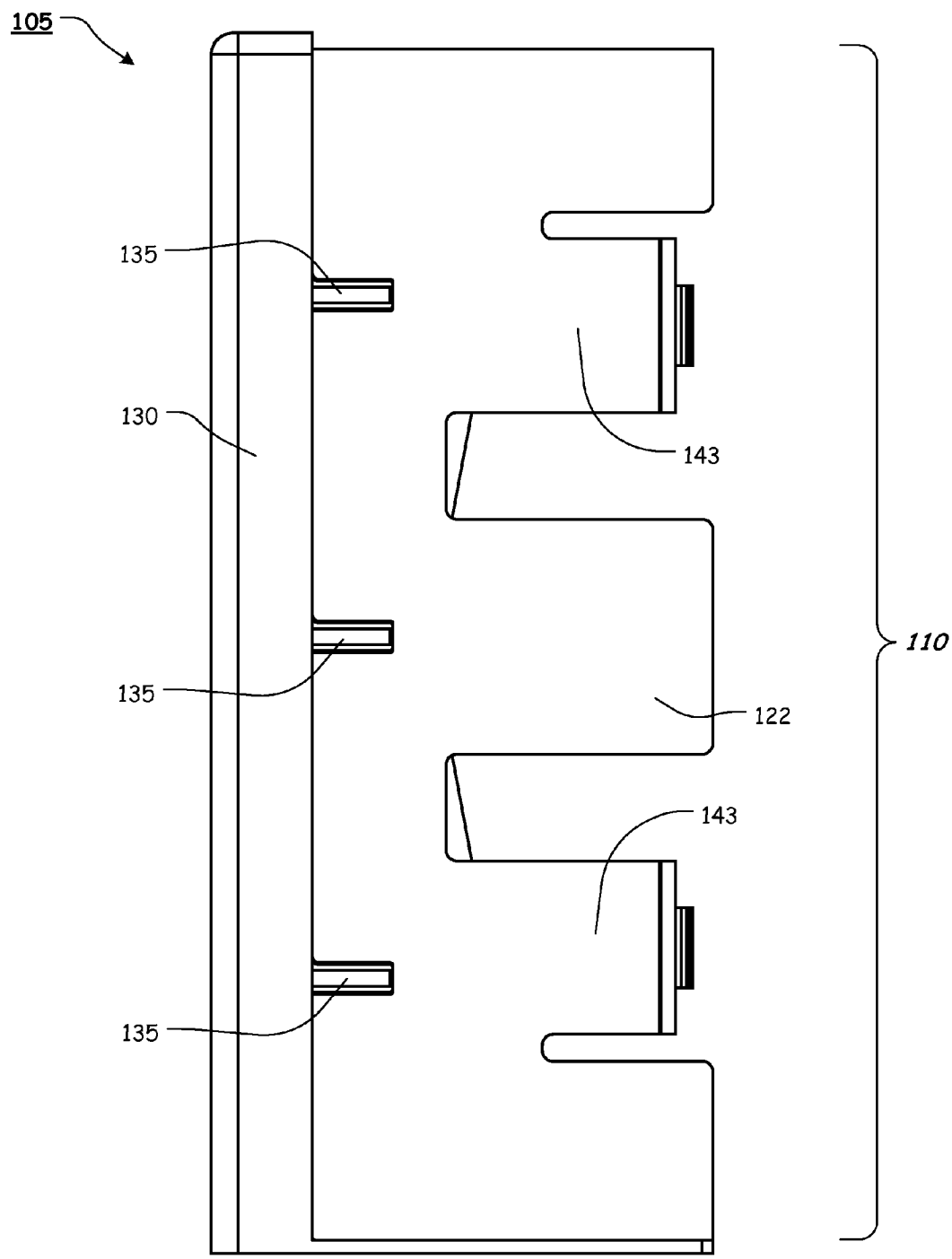
FIG. 3 illustrates a left side view of a first exemplary embodiment of a connector element according to this invention.
Figure 4:
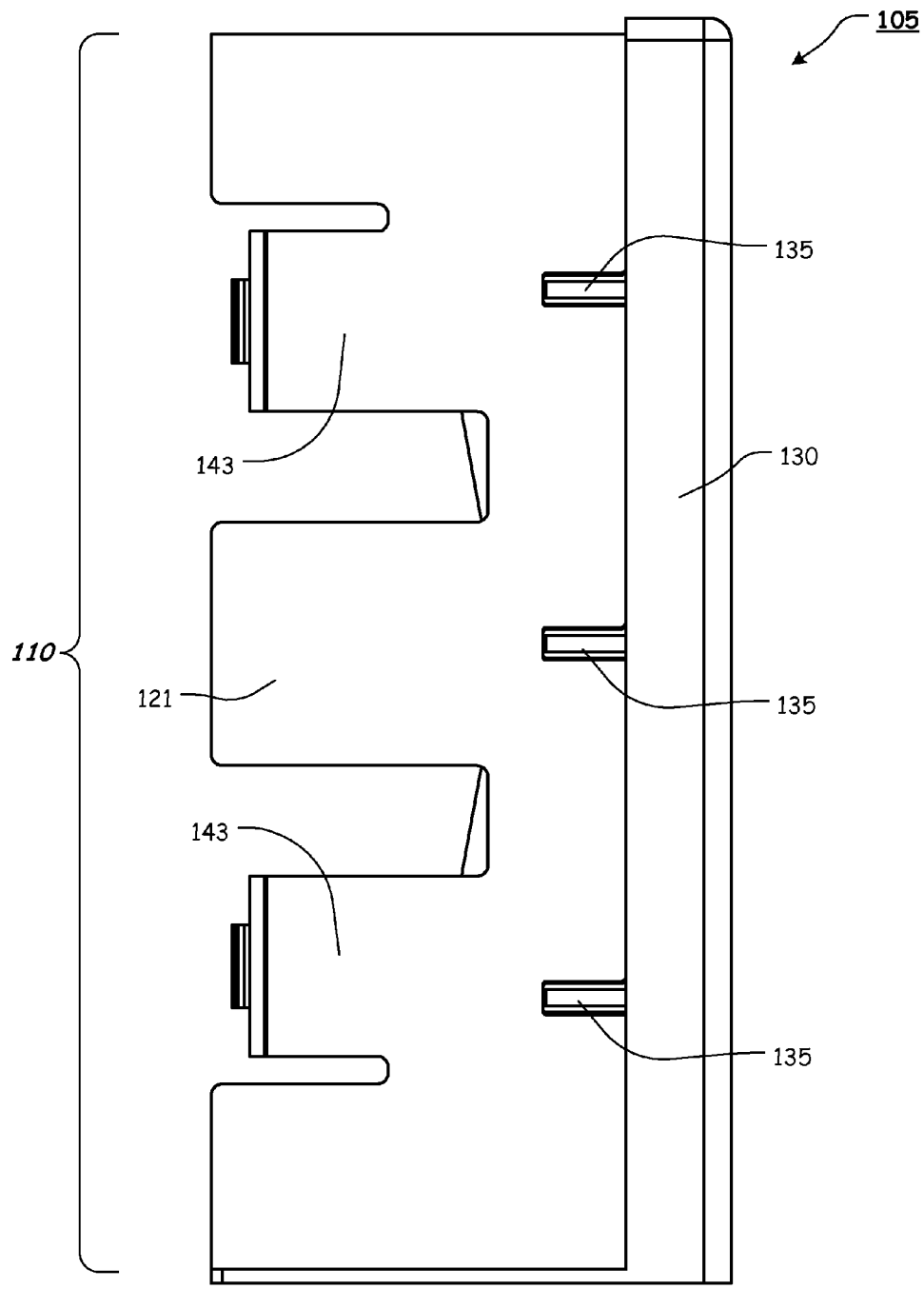
FIG. 4 illustrates a right side view of a first exemplary embodiment of a connector element according to this invention.
Figure 5:
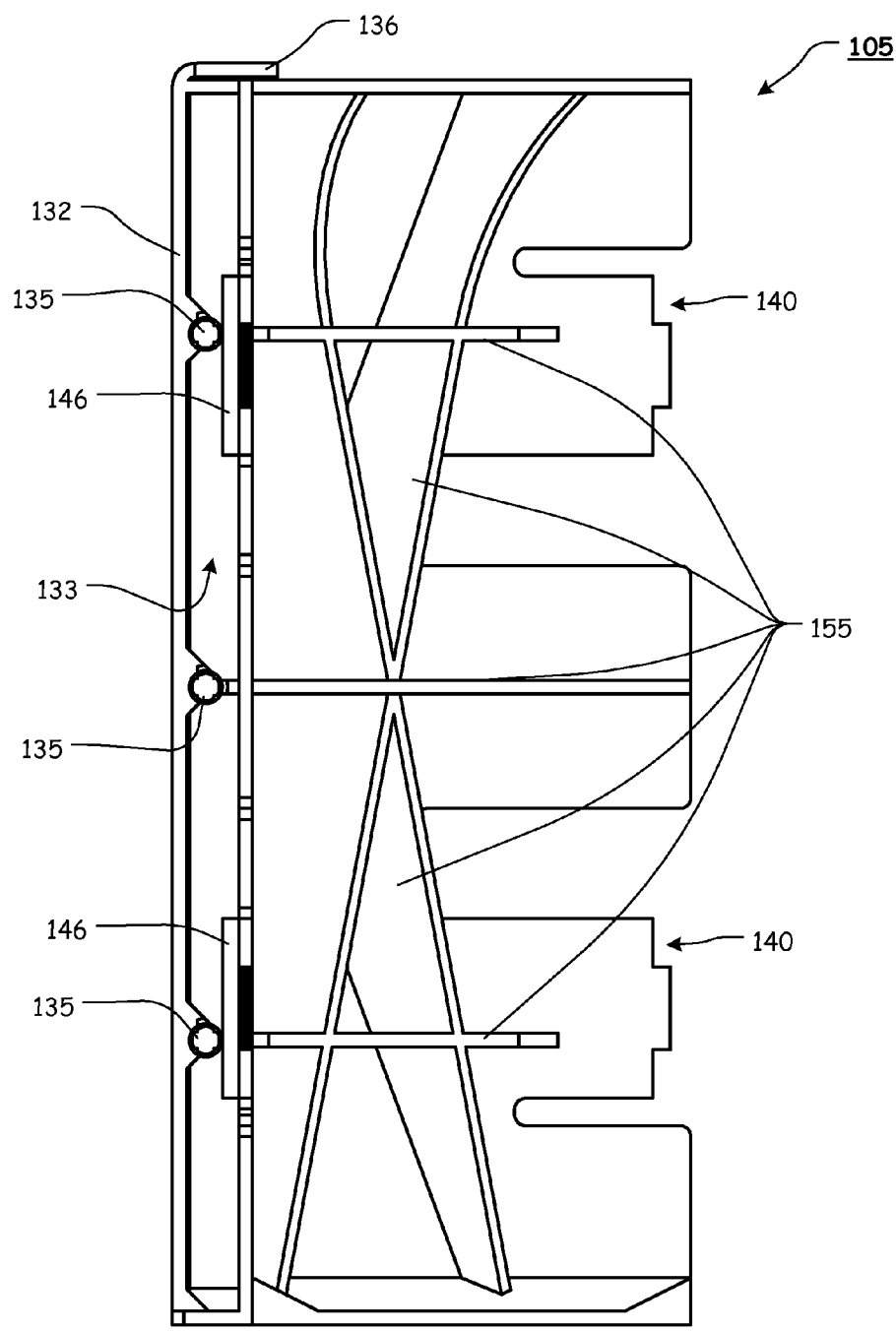
FIG. 5 illustrates a left side rotational view of a first exemplary embodiment of a connector element according to this invention.
Figure 6:
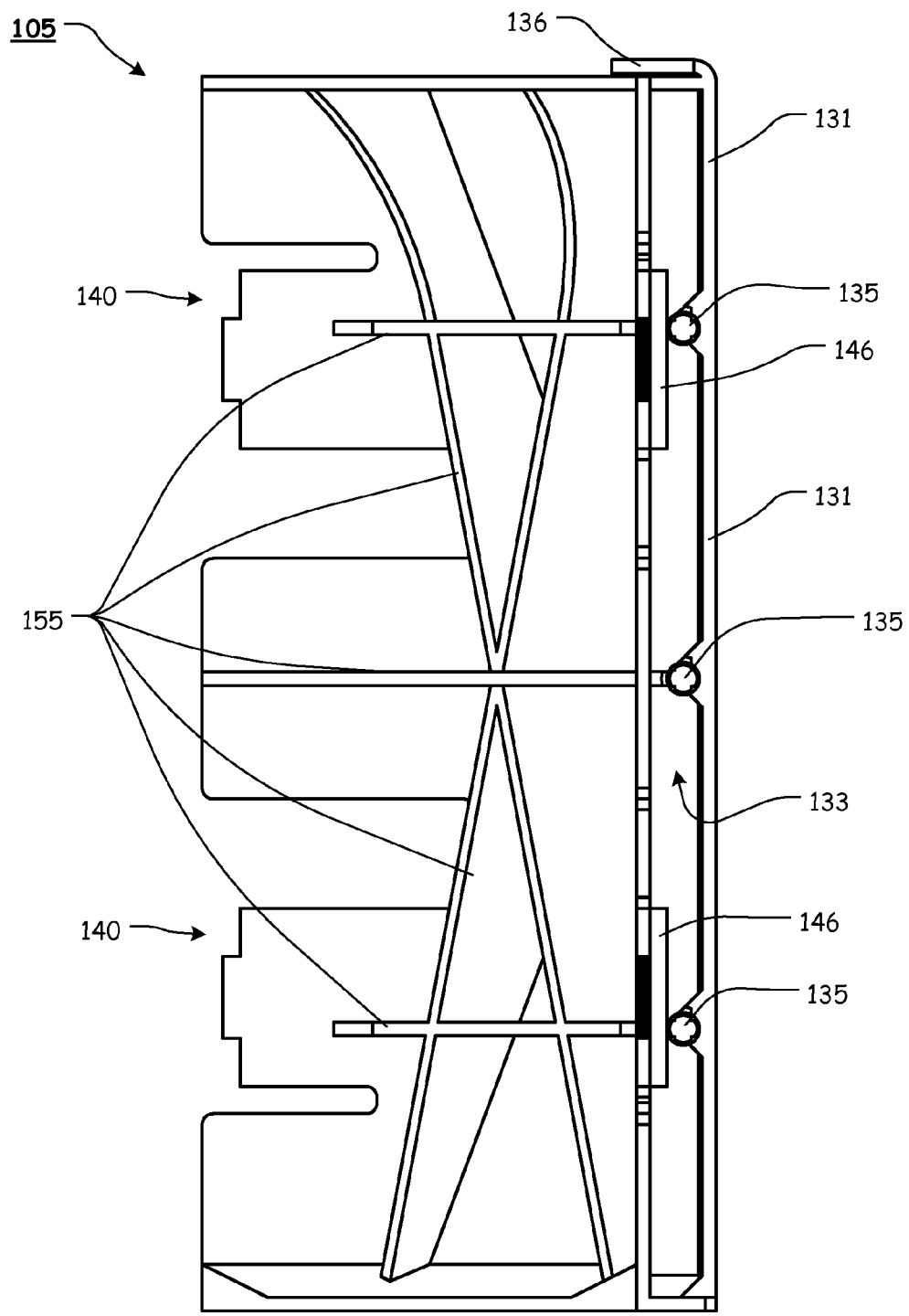
FIG. 6 illustrates a right side rotational view of a first exemplary embodiment of a connector element according to this invention.
Figure 7:
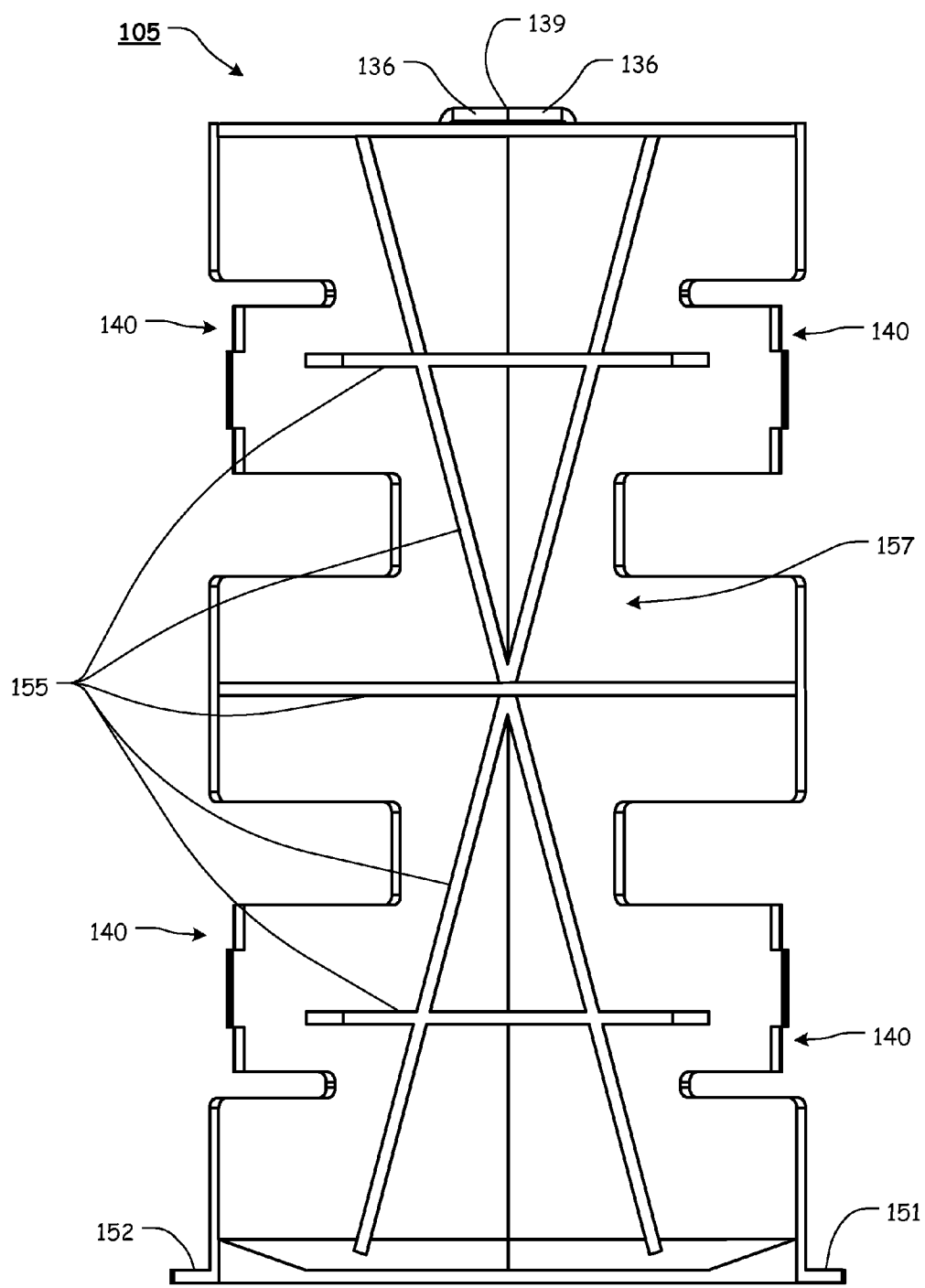
FIG. 7 illustrates a front view of a first exemplary embodiment of a connector element according to this invention.
Figure 8:
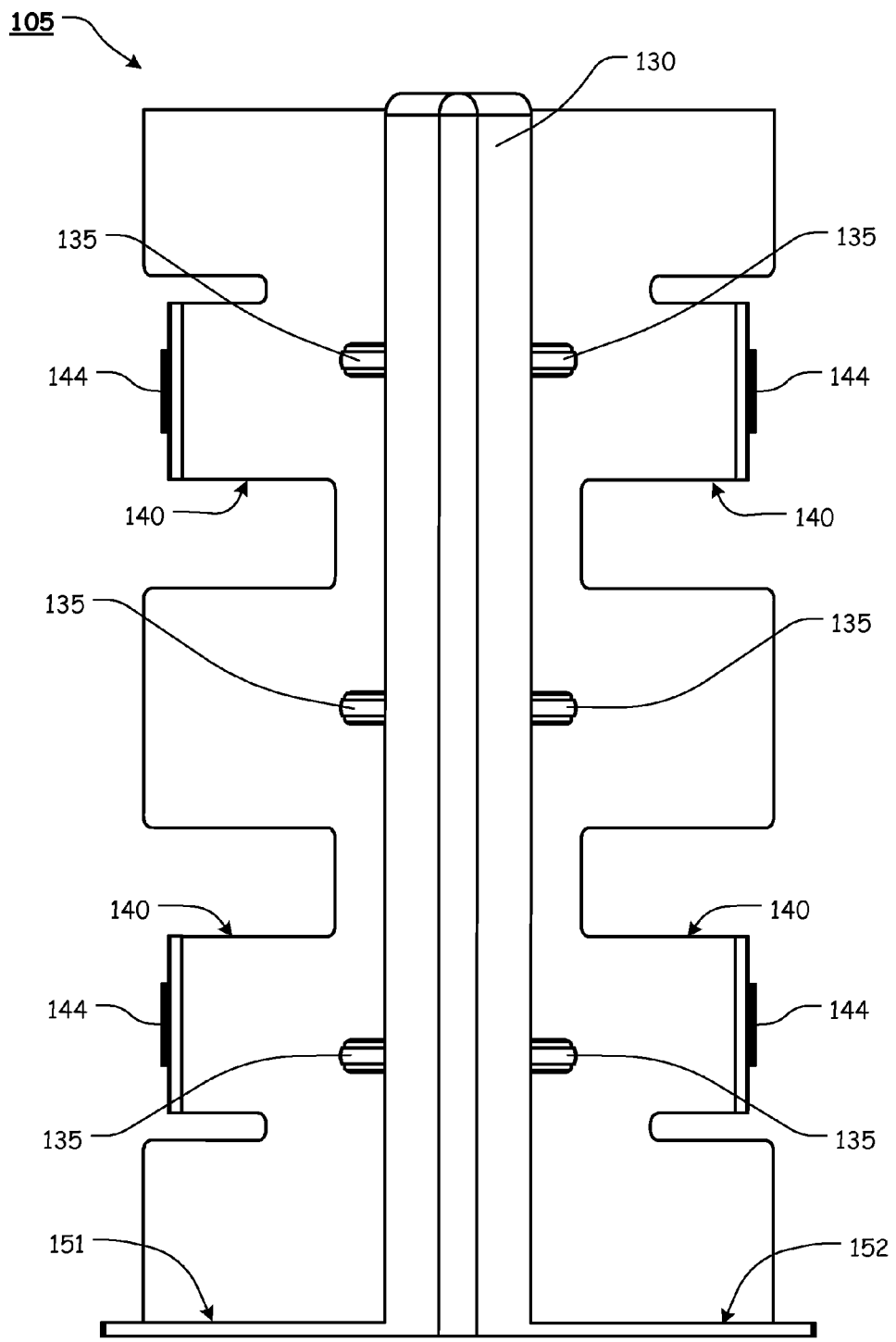
FIG. 8 illustrates a rear view of a first exemplary embodiment of a connector element according to this invention.
Figure 9:
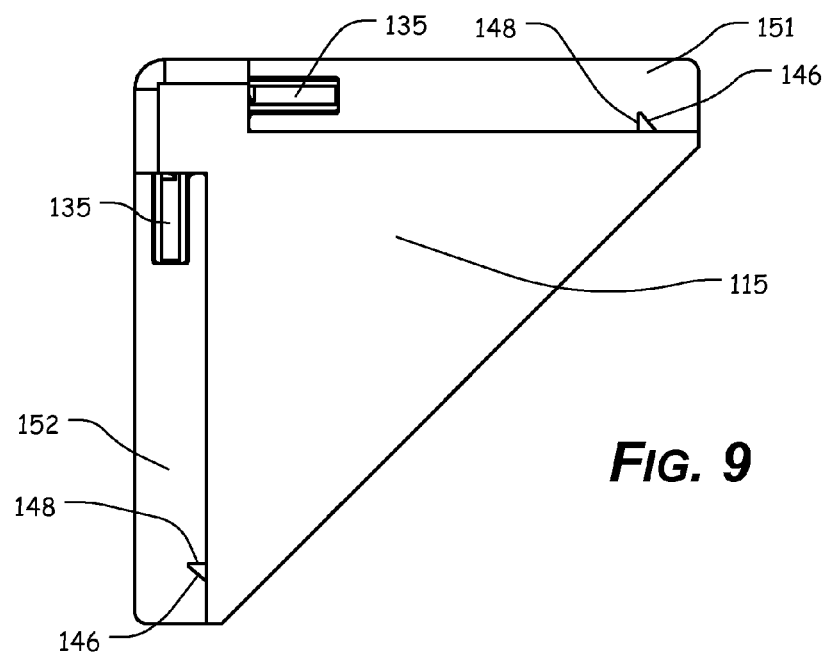
FIG. 9 illustrates a top view of a first exemplary embodiment of a connector element according to this invention.
Figure 10:
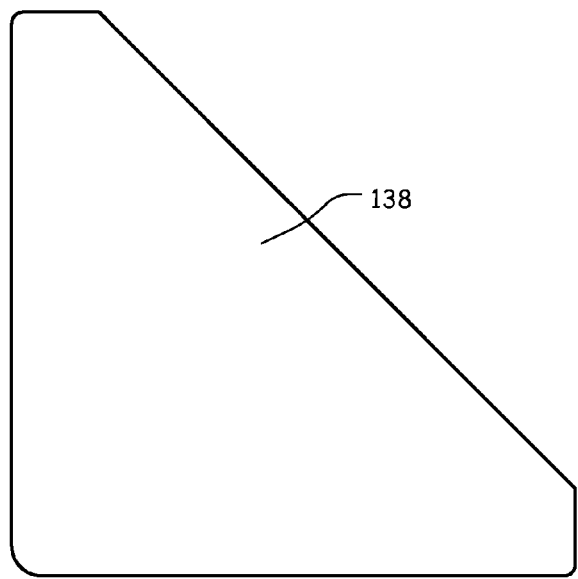
FIG. 10 illustrates a bottom view of a first exemplary embodiment of a connector element according to this invention.
Figure 11:
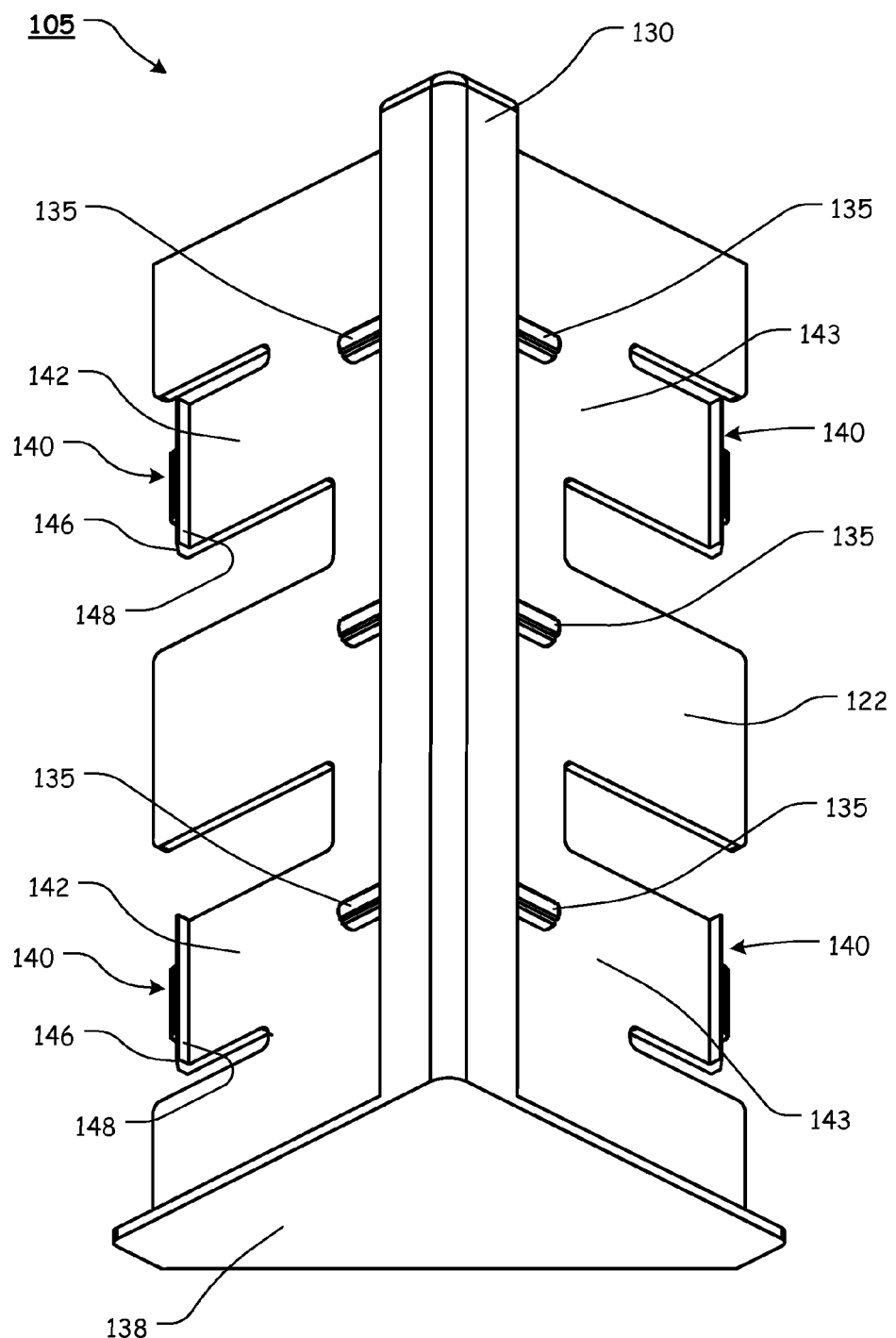
FIG. 11 illustrates a bottom isometric view of a first exemplary embodiment of a connector element according to this invention.

For simplicity and clarification, the design factors and operating principles of the connector elements and foundation assemblies according to this invention are explained with reference to various exemplary embodiments of one or more connector elements and/or foundation assemblies according to this invention. The basic explanation of the design factors and operating principles of the connector elements and foundation assemblies is applicable for the understanding, design, and operation of the connector elements and foundation assemblies of this invention. It should be appreciated that the connector elements and/or the foundation assemblies can be adapted to many applications where a simplified connector element and/or a foundation or other assembly is needed.

As used herein, the word "may" is meant to convey a permissive sense (i.e., meaning "having the potential to"), rather than a mandatory sense (i.e., meaning "must"). Unless stated otherwise, terms such as "first" and "second" are used to arbitrarily distinguish between the elements such terms describe. Thus, these terms are not necessarily intended to indicate temporal or other prioritization of such elements.

The term "coupled", as used herein, is defined as connected, although not necessarily directly, and not necessarily mechanically. The terms "a" and "an" are defined as one or more unless stated otherwise.

Throughout this application, the terms "comprise" (and any form of comprise, such as "comprises" and "comprising"), "have" (and any form of have, such as "has" and "having"), "include", (and any form of include, such as "includes" and "including") and "contain" (and any form of contain, such as "contains" and "containing") are used as open-ended linking verbs. It will be understood that these terms are meant to imply the inclusion of a stated element, integer, step, or group of elements, integers, or steps, but not the exclusion of any other element, integer, step, or group of elements, integers, or steps. As a result, a system, method, or apparatus that "comprises", "has", "includes", or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

It should also be appreciated that the terms "foundation", "foundation assembly", "corner connector", and "connector element" are used for basic explanation and understanding of the operation of the systems, methods, and apparatuses of this invention. Therefore, the terms "foundation", "foundation assembly", "corner connector", and "connector element" are not to be construed as limiting the systems, methods, and apparatuses of this invention. Thus, the terms "foundation" and "foundation assembly" are to be understood to broadly include any structures or devices capable of supporting a load, while the terms "corner connector" and "connector element" is to be understood to broadly include any structure or device capable of joining two elements at a given angle.

Turning now to the drawing Figs., FIGS. 1-11 show a first exemplary embodiment of a connector element 105 according to this invention. In an illustrative, non-limiting embodiment of this invention, as illustrated in FIGS. 1-11, the connector element 105 comprises at least some of a main body portion 110, a deck panel support surface 115, a first side surface 121, a second side surface 122, a corner surface 130, a first abutment surface 131, a second abutment surface 132, a deck panel corner abutment surface 136, a corner 139, and a bottom surface 138.

As illustrated in FIGS. 1-11, the main body portion 110 extends from the substantially planar bottom surface 138 to the substantially planar deck panel support surface 115 and is formed by a substantially planar first abutment surface 131, a substantially planar second abutment surface 132, and a corner surface 130.

The first abutment surface 131 extends substantially perpendicularly from a terminating edge of the first side surface 121 to a first terminating edge. Likewise, the second abutment surface 132 extends substantially perpendicularly from a terminating edge of the second side surface 122 to a first terminating edge. The first abutment surface 131 and the second abutment surface 132 are formed at substantially 90° relative to one another.

The corner surface 130 extends from a terminating edge of the first abutment surface 131 to a terminating edge of the second abutment surface 132.

A first portion of the first abutment surface 131 and the second abutment surface 132 extend above the deck panel support surface 115, while a second portion of the first abutment surface 131 and the second abutment surface 132 terminates at the deck panel support surface 115.

In various exemplary embodiments, as illustrated in FIGS. 1-11, an interior portion of the main body portion 110 (wherein the interior portion is defined substantially between the bottom surface 138, the deck panel support surface 115, the first side surface 121, and the second side surface 122) is at least partially hollow. In these exemplary embodiments, one or more ribs 155 may optionally be formed within the hollow portion 157 of the interior portion. The one or more ribs 155 may provide additional strength and/or rigidity to the main body portion 110.

In various exemplary embodiments, the deck panel corner abutment surface 136 extends substantially perpendicularly from a terminating edge of the deck panel support surface 115.

The corner 139 is defined by the deck panel corner abutment surface 136. In various exemplary embodiments, the deck panel corner abutment surface 136 is a curved surface.

In various exemplary embodiments, as illustrated in FIGS. 1-11, one or more recesses 133 are optionally formed in the first abutment surface 131 in an area between the protrusions 135. The one or more recesses 133 may provide additional strength and/or rigidity to the first abutment surface 131 and/or the corner connector 105.

One or more substantially dowel-shaped protrusions 135 extend perpendicularly from the first abutment surface 131 and the second abutment surface 132. As illustrated in FIGS. 1-11, the connector element 105 includes three substantially dowel-shaped protrusions 135 extending from the first abutment surface 131 and three protrusions 135 extending from the second abutment surface 132. It should be appreciated that the number of protrusions 135 is a design choice based on the desired appearance and functionality of the connector element 105.

The protrusions 135 are formed so as to be aligned with and positioned within appropriately sized, mating recesses 167 and 177 formed in the header elements 160 and the side rail elements 170, respectively. In this manner, the appropriate connector element 105 can be more readily aligned with the appropriate header element 160 and/or side rail element 170 when the foundation assembly 100 is assembled.

While the protrusions 135 are illustrated and described as being substantially cylindrical, with a substantially circular profile, in various exemplary, nonlimiting embodiments, each of the protrusions 135 may have a substantially circular, rectangular, square, or triangular profile.

At least one first deflectable flexible finger 140 extends from the first abutment surface 131. At least a portion of a primary surface 143 of the at least one first deflectable flexible finger 140 extends substantially perpendicular to the first abutment surface 131, and wherein the at least one first deflectable flexible finger 140 comprises a tang 149 that extends, proximate a tip 144 of the at least one first deflectable flexible finger 140, beyond the primary surface 143 of the at least one first deflectable flexible finger 140, to form a camming surface 146 and a shoulder 148.

At least one second deflectable flexible finger 140 extends from the second abutment surface 132. At least a portion of a primary surface 143 of the at least one second deflectable flexible finger 140 extends substantially perpendicular to the second abutment surface 132, and wherein the at least one second deflectable flexible finger 140 comprises a tang 149 that extends, proximate a tip 144 of the at least one second deflectable flexible finger 140, beyond the primary surface 143 of the at least one second deflectable flexible finger 140, to form a camming surface 146 and a shoulder 148.

Each deflectable flexible finger 140 comprises a stem 142, which terminates at a tip 144, and a shoulder 148 and a camming surface 146, which extend from a side portion of the stem 142.

In various exemplary, nonlimiting embodiments, the connector element 105 also includes a first side support shoulder 151 that extends perpendicular to the first abutment surface 131, proximate the bottom surface 138 and a second side support shoulder 152 that extends perpendicular to the second abutment surface 132, proximate the bottom surface 138.

The first side surface 121 and the second side surface 122 are substantially planar and are formed at substantially 90° relative to one another. At least a portion of the first side surface 121 extends substantially perpendicular to the first abutment surface 131 and at least a portion of the second side surface 122 extends substantially perpendicular to the second abutment surface 132. The first side surface 121 and the second side surface 122 are formed at substantially 90° relative to one another, the primary surface 143 of the at least one first deflectable flexible finger 140 is substantially parallel to the first side surface 121, and the primary surface 143 of the at least one second deflectable flexible finger 140 is substantially parallel to the second side surface 122.

One or more optional attachment apertures (not illustrated) may be formed in or through the deck panel support surface 115, the first side surface 121, and/or the second side surface 122. If included, the one or more optional attachment apertures may be sized so as to allow a fasteners, such as, for example, a screw, to more easily attach to the connector element 105.

In various exemplary embodiments, the connector element 105 is substantially rigid and is formed of a polymeric material such as a polymeric composite. Alternate materials of construction may include one or more of the following: wood, steel, aluminum, titanium, and/or other metals, as well as various alloys and composites thereof, glass-hardened polymers, polymer or fiber reinforced metals, carbon fiber or glass fiber composites, continuous fibers in combination with thermoset and thermoplastic resins, chopped glass or carbon fibers used for injection molding compounds, laminate glass or carbon fiber, epoxy laminates, woven glass fiber laminates, impregnate fibers, polyester resins, epoxy resins, phenolic resins, polyimide resins, cyanate resins, high-strength plastics, nylon, glass, or polymer fiber reinforced plastics, thermoform and/or thermoset materials, and/or various combinations of the foregoing. Thus, it should be understood that the material or materials used to form the connector element 105 is a design choice based on the desired appearance and functionality of the connector element 105.

It should be appreciated that the connector element 105 may be integrally formed. Alternatively, suitable materials can be used and sections are elements made independently and attached or coupled together, such as by adhesives, staples, screws, nails, or other fasteners, to form the connector element 105.

It should be understood that the overall size and shape of the connector element 105, and the various portions thereof, is a design choice based upon the desired functionality and/or appearance of the connector element 105. Additionally, it should be appreciated that the connector element 105 is formed such that multiple connector elements 105 may be positioned and used as each of the four corners of a foundation assembly 100. Therefore, multiple connector elements do not have to be formed for a specific location at a specific corner of a foundation assembly 100.

As illustrated in FIGS. 13-22, the connector element 105 may be used to construct a foundation assembly 100. As illustrated in FIGS. 13-22, the foundation assembly 100 comprises at least some of a plurality of connector elements 105, header elements 160 (each header element 160 having recesses 167 and tang receiving grooves 165), side rail elements 170 (each side rail element 170 having recesses 177 and tang receiving grooves 175).

Figure 12:
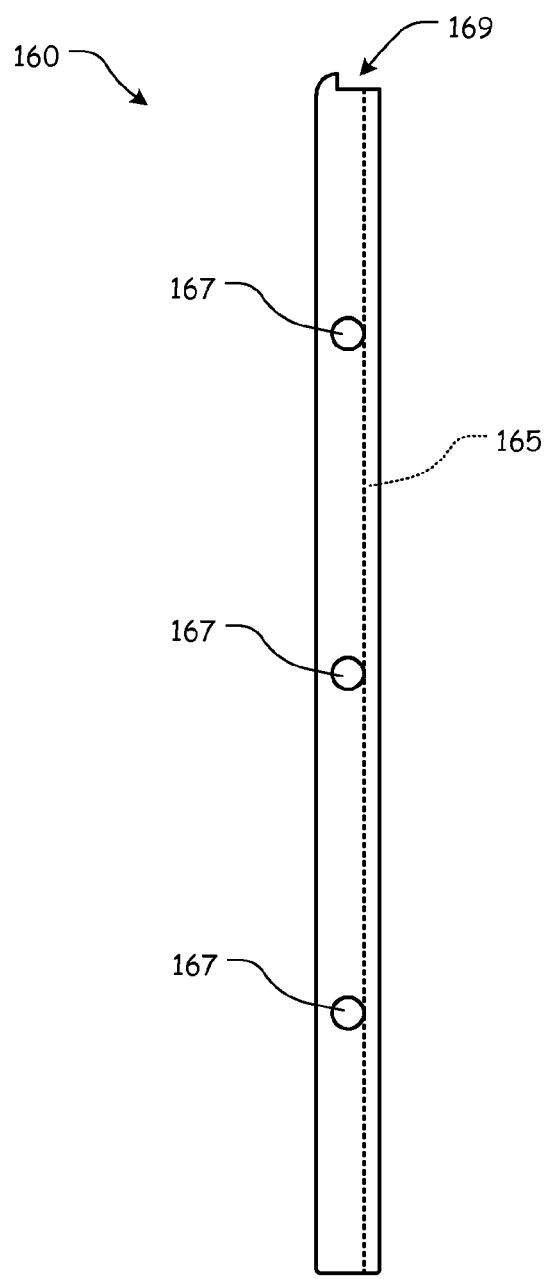
FIG. 12 shows a cross-sectional view of an exemplary side rail element according to this invention.

FIG. 12 shows a cross-sectional view of an exemplary header element 160 (or side rail element 170) according to this invention. As illustrated in FIG. 12, the header elements 160 each include one or more recesses 137 formed in each end. It should be understood that each of the one or more recesses 137 is formed so as to allow one of the protrusions 135 of the connector elements 105 to be positioned within the recess 137. Thus, for example, if the connector element 105 includes three protrusions 135, three mating recesses 137 will be formed in each end of the header elements 160 and the side rail elements 170. Each of the header elements 160 also includes a recessed notch 169 to accommodate a flush-mounted deck panel 180.

Each of the header elements 160 has at least one tang receiving groove 165 formed on an interior side of the header element 160, perpendicular to the longitudinal axis of the header element 160. These one or more tang receiving grooves 165 are formed so as to accept at least a portion of a tang 149, as described herein.

While elements of the header elements 160 are illustrated in FIG. 12. It should be appreciated, however, that the features of the side rail elements 170 correspond to the elements of the header elements 160 and may, in fact, be identical to the elements of the header elements 160. However, typically the rail elements 170 are longer in length than the header elements 160.

Due to the shape and placement of the first side surface 121, the second side surface 122, the first abutment surface 131, and the second abutment surface 132, so long as the header elements 160 are of an equal length and the side rail elements 170 are of an equal length, and so long as each of the header elements 160 and the side rail elements 170 has a terminating end that is parallel and perpendicular to the longitudinal axis of the element, when the interior side of the element is positioned against a corresponding first side surface 121 or the second side surface 122 of a connector element 105 and the terminating end is positioned against a corresponding first abutment surface 131 or second abutment surface 132, the header elements 160 will be parallel to one another and the side rail elements 170 will be parallel to one another.

In order to construct a foundation assembly 100, four connector elements 105 are positioned at locations proximate the four corners of the finished foundation assembly 100.

When properly positioned, the header elements 160 and the side rail elements 170 are each guided, by the interaction of the protrusions 135 with the recesses 167 and 177 and receipt of the protrusions 135 within the recesses 167 and 177.

In this manner, an end surface of the header elements 160 and the side rail elements 170 contacts an appropriate first abutment surface 131 or second abutment surface 132, and an inner surface of the header elements 160 and the side rail elements 170 contacts an appropriate first side surface 121 or second side surface 122.

As illustrated in FIGS. 13-18, a corner connector 105 is properly aligned with and urged toward a header element 160 (or side rail element 170), the side surface 122 and/or a portion of the primary surface 143 contacts an inner surface of the header element 160 (or side rail element 170). As the corner connector 105 is further or urged, the camming surface 146 of the tang 149 contacts the inner surface of the header element 160 and the finger 140 is flexed inwardly so as to ride along the inner surface of the header element 160.

Figure 14:
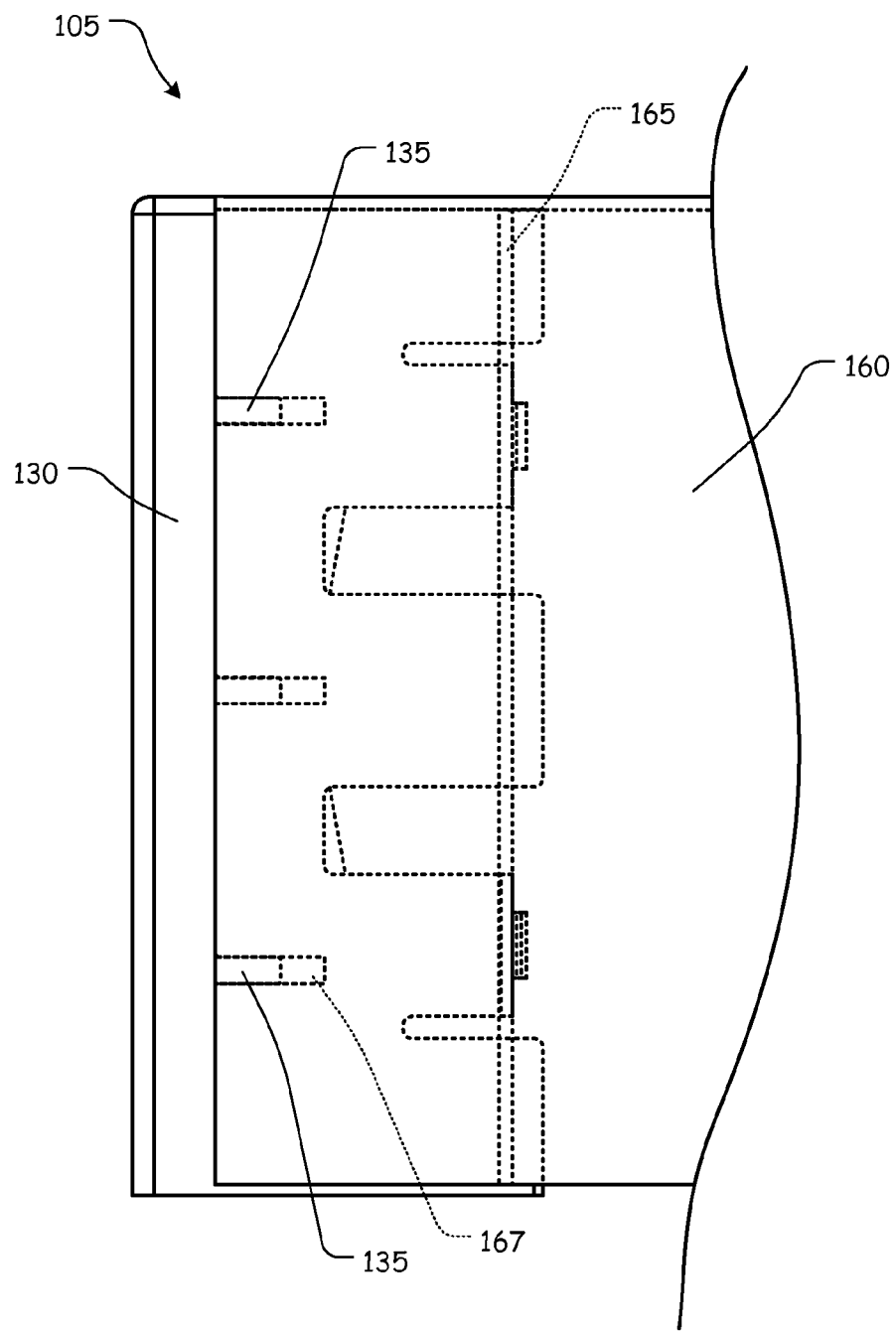
FIG. 14 shows a left side view of a first exemplary embodiment of a connector element attached to an exemplary side rail element according to this invention.
Figure 15:
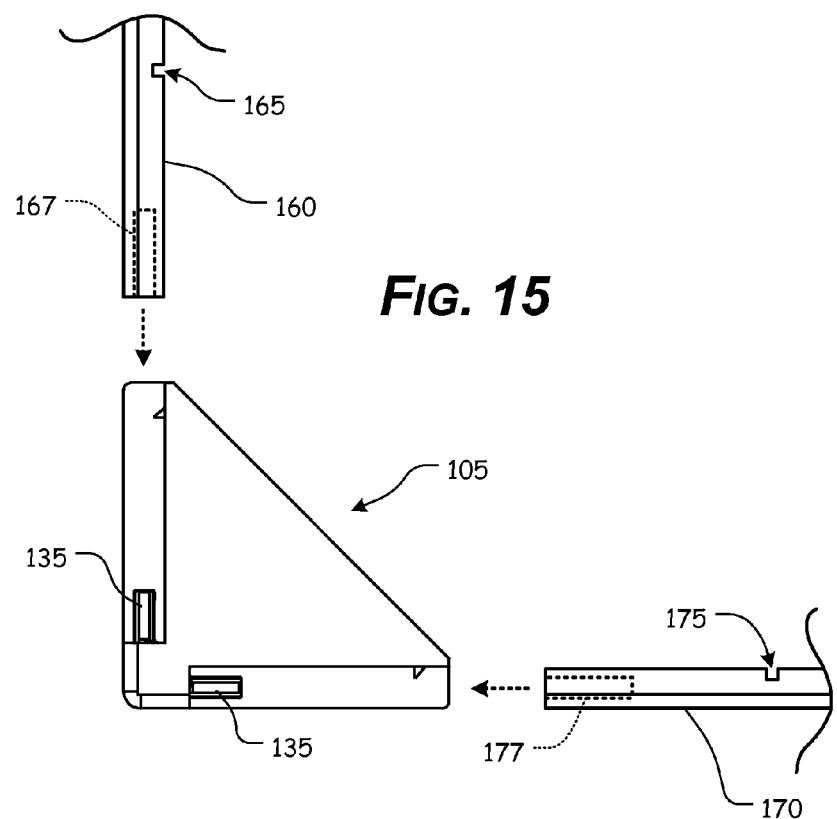
FIG. 15 shows a top view of a first exemplary embodiment of a connector element aligned with an exemplary side rail element and an exemplary header element according to this invention.
Figure 16:
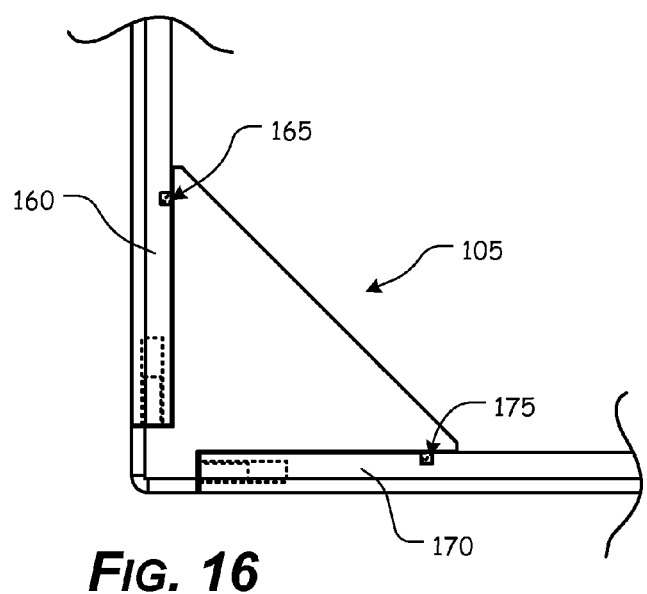
FIG. 16 shows a top view of a first exemplary embodiment of a connector element attached to an exemplary side rail element and an exemplary header element according to this invention.
Figure 17:
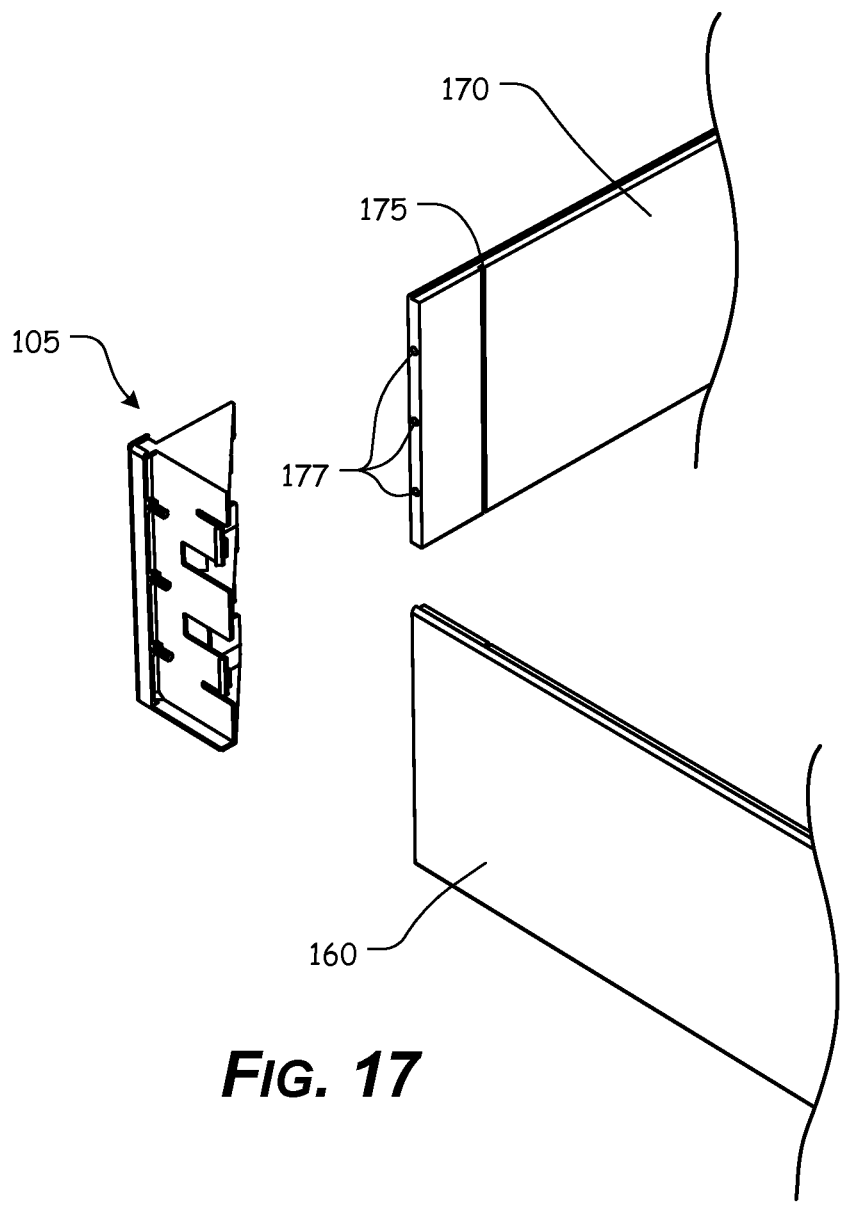
FIG. 17 shows an upper, isometric perspective view of a first exemplary embodiment of a connector element aligned with an exemplary side rail element and an exemplary header element according to this invention.
Figure 18:
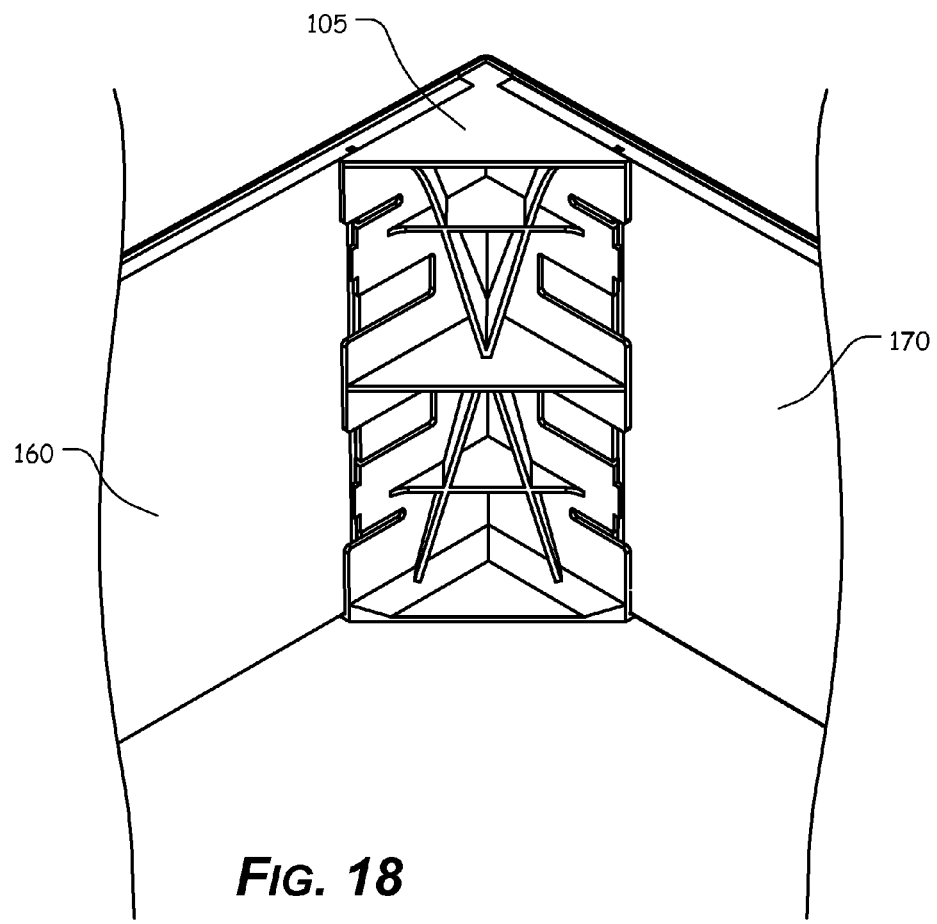
FIG. 18 shows a top perspective view of a first exemplary embodiment of a connector element attached to an exemplary side rail element and an exemplary header element according to this invention.
Figure 19:
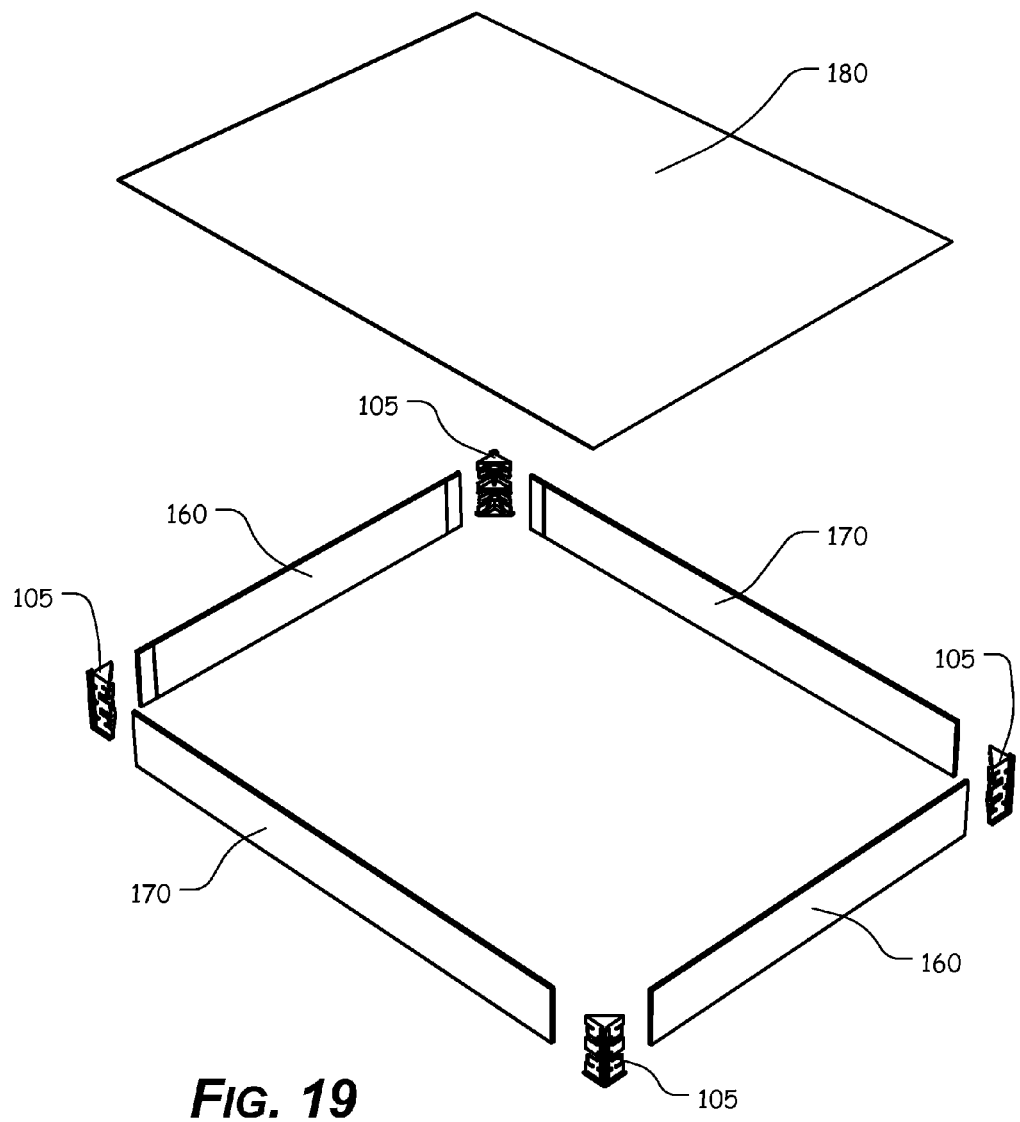
FIG. 19 shows an exploded perspective view of a first exemplary embodiment of certain of the components of a foundation assembly according to this invention.

The fingers 140 continues to be flexed inwardly until shoulders 148 passed beyond an edge of the tang receiving groove 165, whereupon the spring bias of the stressed stem 142 causes the fingers 140 to snap outwardly and the tang 149 is urged into the tang receiving groove 165, to assume the position as illustrated in FIG. 14.

When the tang 149 is positioned within the tang receiving groove 165, the shoulder 148 contacts and engages a sidewalls surface of the tang receiving groove 165, firmly mounting the header element 160 on the corner connector 105. When assembled, the interaction of the tang 149 with the tang receiving groove 165 restraining axial movement of the header element 160 with respect to the corner connector 105. Particularly, when a withdrawing force is applied to the header element 160, the abutting relation of the shoulder 104 and the tang receiving groove 165 will preclude axial movement, thereby precluding the disengagement of the corner connector 105 and the header element 160.

It is further noted that if the angle of the shoulder 148 includes an undercut, the greater the withdrawing force applied the header element 160, the stronger the engagement between the tangs 149 and the tang receiving grooves 165 becomes, as the withdrawing force will cause tangs 149 to further flex inward restraining the movement of the header element 160.

Figure 13:
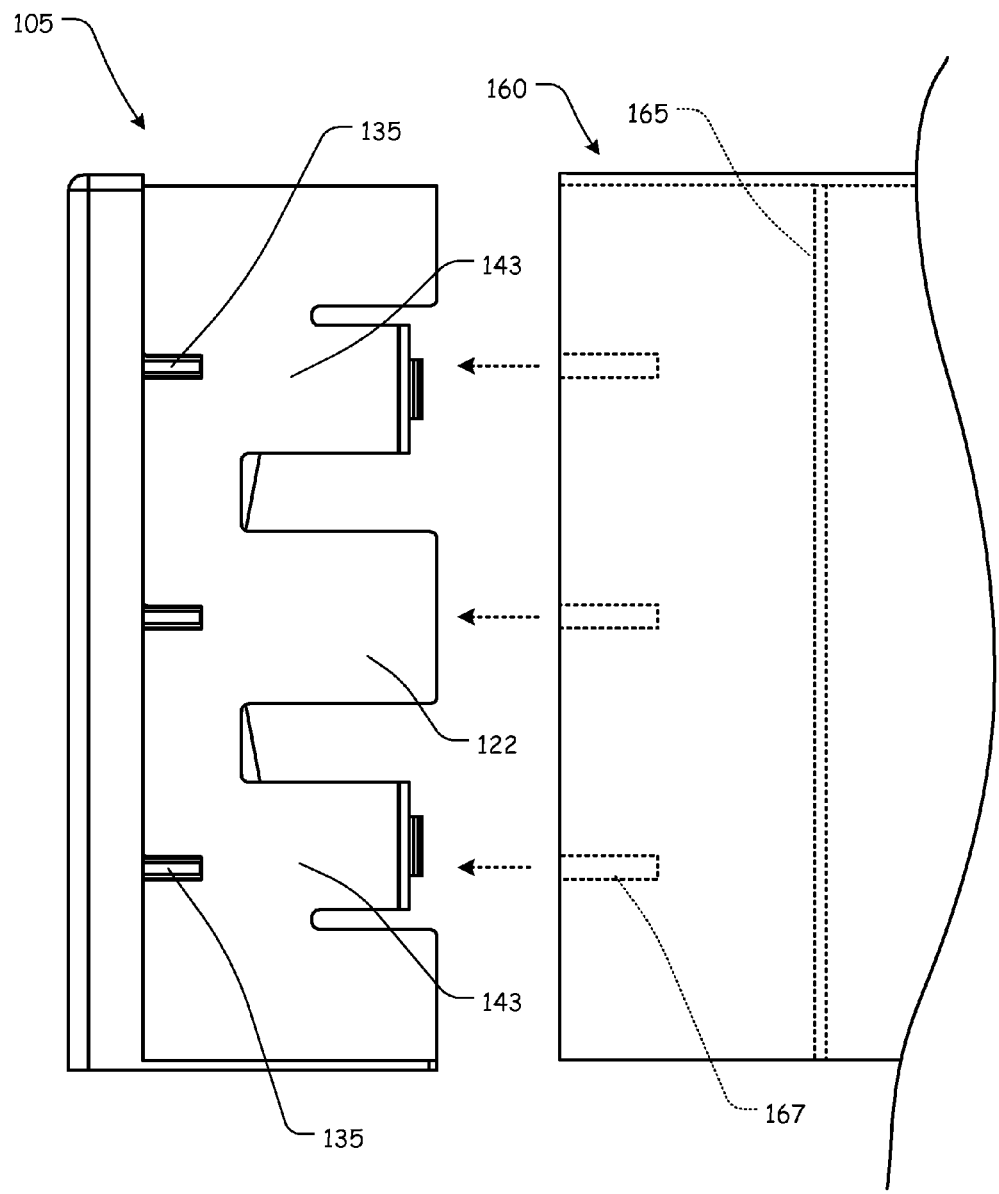
FIG. 13 shows a left side view of a first exemplary embodiment of a connector element aligned with an exemplary side rail element according to this invention.

While FIGS. 13 and 14 illustrate a corner connector 105 being attached to a header element 160, it should be appreciated that the corner connector 105 may be attached to a side rail element 170 (as illustrated in FIGS. 15-18) in the same manner.

Figure 20:
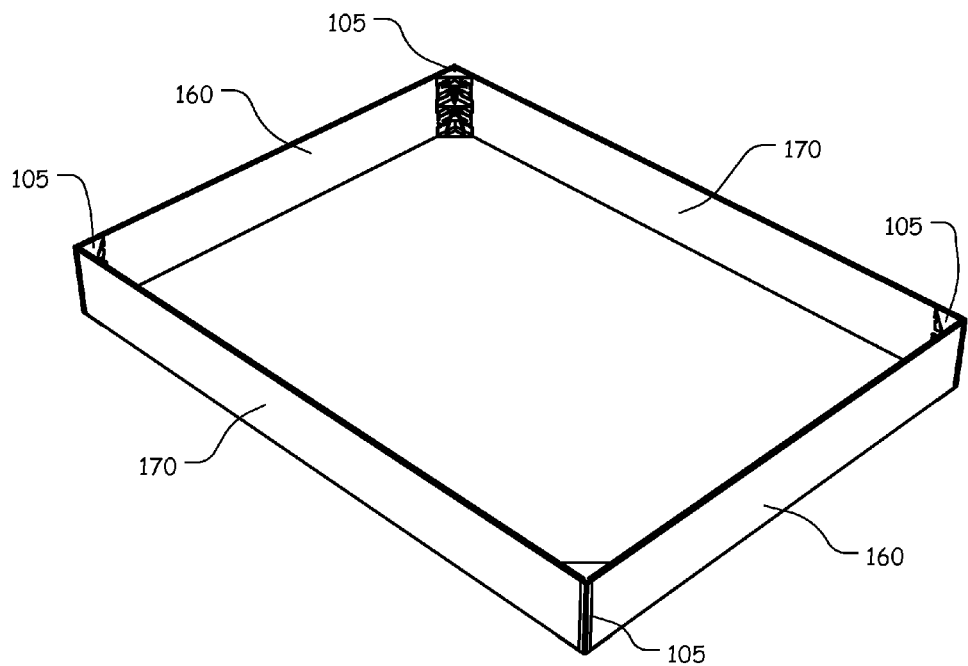
FIG. 20 shows a top isometric perspective view of a partially assembled foundation assembly according to this invention.
Figure 21:
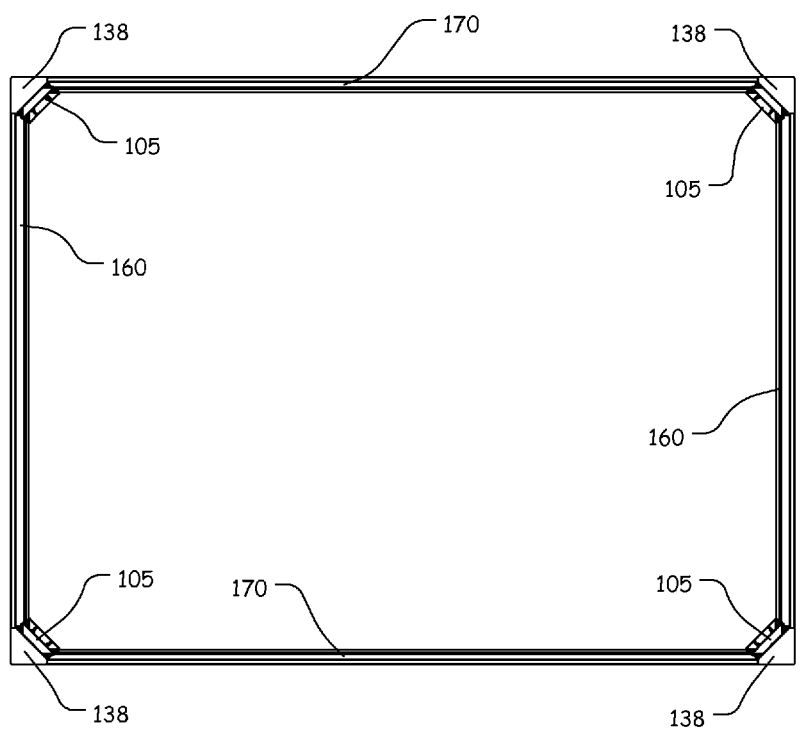
FIG. 21 shows a bottom perspective view of a partially assembled foundation assembly according to this invention.

Once each of the corner connectors 105, header elements 160, and side wall elements 170 are attached, coupled, or secured together, the assembly 100 is partially assembled as illustrated in FIGS. 20 and 21. FIGS. 20 and 21 show a top and bottom view, respectively, of a partially assembled foundation, wherein the deck panel 180 has not yet been added to the assembly 100.

Figure 22:
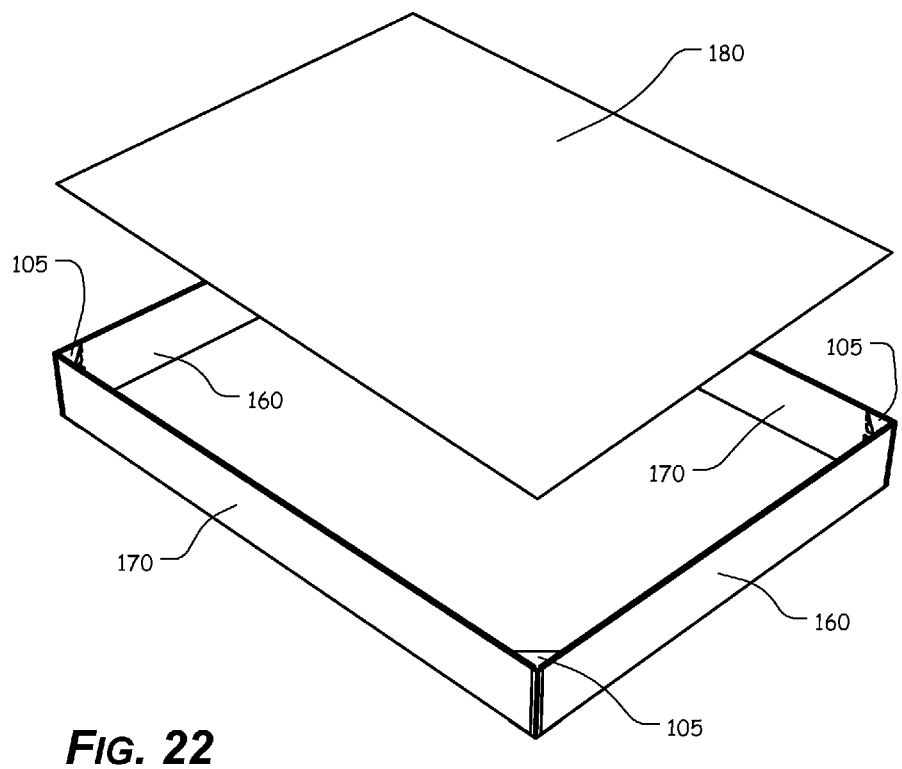
FIG. 22 shows a top isometric perspective view of a partially assembled foundation assembly, including an exemplary deck panel according to this invention.

Finally, as illustrated in FIG. 22, the deck panel 180 can be placed atop the deck panel support surfaces 115, within the recessed notch 169 of the header elements 160 and the recessed notch 179 of the side rail elements 170, so as to be flush-mounted with a top surface of the header elements 160, the rail elements 170, and the connector elements 105.

Once assembled, the foundation assembly 100 can be placed in a bed frame (not shown) for receiving a mattress.

While this invention has been described in conjunction with the exemplary embodiments outlined above, the foregoing description of exemplary embodiments of the invention, as set forth above, are intended to be illustrative, not limiting and the fundamental invention should not be considered to be necessarily so constrained. It is evident that the invention is not limited to the particular variation set forth and many alternatives, adaptations modifications, and/or variations will be apparent to those skilled in the art.

Furthermore, where a range of values is provided, it is understood that every intervening value, between the upper and lower limit of that range and any other stated or intervening value in that stated range is encompassed within the invention. The upper and lower limits of these smaller ranges may independently be included in the smaller ranges and is also encompassed within the invention, subject to any specifically excluded limit in the stated range. Where the stated range includes one or both of the limits, ranges excluding either or both of those included limits are also included in the invention.

It is to be understood that the phraseology of terminology employed herein is for the purpose of description and not of limitation. Unless defined otherwise, all technical and scientific terms used herein have the same meaning as commonly understood by one of ordinary skill in the art to which this invention belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the invention, such that others may, by applying current knowledge, change, vary, modify, and/or adapt these exemplary, non-limiting embodiments for various applications without departing from the spirit and scope of the invention and elements or methods similar or equivalent to those described herein can be used in practicing the present invention. Any and all such changes, variations, modifications, and/or adaptations should and are intended to be comprehended within the meaning and range of equivalents of the disclosed exemplary embodiments and may be substituted without departing from the true spirit and scope of the invention.

Also, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. A connector element, comprising:
    a body portion formed by a substantially planar first abutment surface, a substantially planar second abutment surface, and a corner surface, wherein said first abutment surface extends to a first terminating edge, wherein said second abutment surface extends to a first terminating edge, wherein said first abutment surface and said second abutment surface are formed at substantially 90° relative to one another, and wherein said corner surface extends between said first terminating edge of said first abutment surface and said first terminating edge of said second abutment surface;
    wherein a first portion of said first abutment surface extends from a substantially planar bottom surface to a substantially planar deck panel support surface and wherein a second portion of said first abutment surface extends from said bottom surface above said deck panel support surface;
    wherein a first portion of said second abutment surface extends from said bottom surface to said deck panel support surface and wherein a second portion of said second abutment surface extends from said bottom surface above said deck panel support surface;
    a first deck panel corner abutment surface extending substantially perpendicularly from a first terminating edge of said deck panel support surface between said first portion of said first abutment surface and said second portion of said first abutment surface;
    a first side support shoulder extending substantially perpendicular to said first abutment surface and a first side surface formed between said deck panel support surface and said first side support shoulder;
    a second deck panel corner abutment surface extending substantially perpendicularly from a second terminating edge of said deck panel support surface between said first portion of said second abutment surface and said second portion of said second abutment surface;
    a second side support shoulder extending substantially perpendicular to said second abutment surface and a second side surface formed between said deck panel support surface and said second side support shoulder;
    wherein said first deck panel corner abutment surface and said second deck panel corner abutment surface are formed at substantially 90° relative to one another;
    one or more substantially dowel-shaped protrusions extend perpendicular to said first abutment surface;
    one or more substantially dowel-shaped protrusions extend perpendicular to said second abutment surface;
    at least one first deflectable flexible finger, wherein at least a portion of a primary surface of said at least one first deflectable flexible finger extends substantially perpendicular to said first abutment surface, wherein said at least one first deflectable flexible finger comprises a tang that extends, proximate a tip of said at least one first deflectable flexible finger, beyond said primary surface of said at least one first deflectable flexible finger, and wherein said primary surface of said at least one first deflectable flexible finger is coplanar with at least a portion of said first side surface; and
    at least one second deflectable flexible finger, wherein at least a portion of a primary surface of said at least one second deflectable flexible finger extends substantially perpendicular to said second abutment surface, and wherein said at least one second deflectable flexible finger comprises a tang that extends, proximate a tip of said at least one second deflectable flexible finger, beyond said primary surface of said at least one second deflectable flexible finger, and wherein said primary surface of said at least one second deflectable flexible finger is coplanar with at least a portion of said second side surface.

2. The connector element of claim 1, wherein said first side support shoulder extends substantially perpendicular to said first abutment surface, proximate said bottom surface and wherein said second side support shoulder extends substantially perpendicular to said second abutment surface, proximate said bottom surface.

3. The connector element of claim 1,
    wherein said first side surface and said second side surface are formed at substantially 90° relative to one another, and wherein said primary surface of said at least one first deflectable flexible finger is substantially parallel to said first side surface and said primary surface of said at least one second deflectable flexible finger is substantially parallel to said second side surface.

4. The connector element of claim 1, wherein said first side support shoulder extends substantially perpendicular to said first side surface, proximate said bottom surface and said second side support shoulder extends substantially perpendicular to said second side surface, proximate said bottom surface.

5. The connector element of claim 1, wherein each deflectable flexible finger comprises a stem, which terminates at a tip.

6. The connector element of claim 5, wherein each tang comprises a camming surface, which joins said stem by a radially extending shoulder.

7. The connector element of claim 1, wherein said connector element is formed of two or more sections or elements attached or coupled together to form said connector element.

8. The connector element of claim 1, wherein said connector element is formed as an integral unit.

9. The connector element of claim 1, wherein each protrusion has a substantially circular, rectangular, square, or triangular profile.

10. A connector element, comprising:
a body portion formed by a substantially planar first abutment surface, a substantially planar second abutment surface, and a corner surface, wherein said first abutment surface extends to a first terminating edge, wherein said second abutment surface extends to a first terminating edge, and wherein said corner surface extends between said first terminating edge of said first abutment surface and said first terminating edge of said second abutment surface;
wherein a first portion of said first abutment surface extends from a substantially planar bottom surface to a substantially planar deck panel support surface and wherein a second portion of said first abutment surface extends from said bottom surface above said deck panel support surface;
wherein a first portion of said second abutment surface extends from said bottom surface to said deck panel support surface and wherein a second portion of said second abutment surface extends from said bottom surface above said deck panel support surface;
a first deck panel corner abutment surface and a second deck panel corner abutment surface formed at substantially 90° relative to one another;
a first side support shoulder extending substantially perpendicular to said first abutment surface and a first side surface formed between said deck panel support surface and said first side support shoulder;
a second side support shoulder extending substantially perpendicular to said second abutment surface and a second side surface formed between said deck panel support surface and said second side support shoulder;
one or more substantially dowel-shaped protrusions extend perpendicular to said first abutment surface;
one or more substantially dowel-shaped protrusions extend perpendicular to said second abutment surface; and
at least one first deflectable flexible finger, wherein at least a portion of a primary surface of said at least one first deflectable flexible finger is coplanar with at least a portion of said first side surface and extends substantially perpendicular to said first abutment surface, and wherein said at least one first deflectable flexible finger comprises a tang that extends, proximate a tip of said at least one first deflectable flexible finger, beyond said primary surface of said at least one first deflectable flexible finger.

11. The connector element of claim 10, further comprising:
at least one second deflectable flexible finger, wherein at least a portion of a primary surface of said at least one second deflectable flexible finger is coplanar with at least a portion of said second side surface and extends substantially perpendicular to said second abutment surface, and wherein said at least one second deflectable flexible finger comprises a tang that extends, proximate a tip of said at least one second deflectable flexible finger, beyond said primary surface of said at least one second deflectable flexible finger.

12. The connector element of claim 10, wherein each deflectable flexible finger comprises a stem, which terminates at a tip.

13. The connector element of claim 12, wherein each tang comprises a camming surface, which joins said stem by a radially extending shoulder.

14. The connector element of claim 10, wherein said connector element is formed of two or more sections or elements attached or coupled together to form said connector element.

15. The connector element of claim 10, wherein said connector element is formed as an integral unit.

16. The connector element of claim 10, wherein each protrusion has a substantially circular, rectangular, square, or triangular profile.

17. A foundation assembly, comprising:
at least four connector elements, wherein each connector element comprises:
a body portion formed by a substantially planar first abutment surface, a substantially planar second abutment surface, and a corner surface, wherein said first abutment surface extends to a first terminating edge, wherein said second abutment surface extends to a first terminating edge, wherein said first abutment surface and said second abutment surface are formed at substantially 90° relative to one another, and wherein said corner surface extends between said first terminating edge of said first abutment surface and said first terminating edge of said second abutment surface;
wherein a first portion of said first abutment surface extends from a substantially planar bottom surface to a substantially planar deck panel support surface and wherein a second portion of said first abutment surface extends from said bottom surface above said deck panel support surface;
wherein a first portion of said second abutment surface extends from said bottom surface to said deck panel support surface and wherein a second portion of said second abutment surface extends from said bottom surface above said deck panel support surface;
a first deck panel corner abutment surface extending substantially perpendicularly from a first terminating edge of said deck panel support surface between said first portion of said first abutment surface and said second portion of said first abutment surface;
a first side support shoulder extending substantially perpendicular to said first abutment surface and a first side surface formed between said deck panel support surface and said first side support shoulder;
a second deck panel corner abutment surface extending substantially perpendicularly from a second terminating edge of said deck panel support surface between said first portion of said second abutment surface and said second portion of said second abutment surface;
a second side support shoulder extending substantially perpendicular to said second abutment surface and a second side surface formed between said deck panel support surface and said second side support shoulder;
wherein said first deck panel corner abutment surface and said second deck panel corner abutment surface are formed at substantially 90° relative to one another;
one or more substantially dowel-shaped protrusions extend perpendicular to said first abutment surface;
one or more substantially dowel-shaped protrusions extend perpendicular to said second abutment surface;

at least one first deflectable flexible finger, wherein at least a portion of a primary surface of said at least one first deflectable flexible finger extends substantially perpendicular to said first abutment surface, wherein said at least one first deflectable flexible finger comprises a tang that extends, proximate a tip of said at least one first deflectable flexible finger, beyond said primary surface of said at least one first deflectable flexible finger, and wherein said primary surface of said at least one first deflectable flexible finger is coplanar with at least a portion of said first side surface; and at least one second deflectable flexible finger, wherein at least a portion of a primary surface of said at least one second deflectable flexible finger extends substantially perpendicular to said second abutment surface, and wherein said at least one second deflectable flexible finger comprises a tang that extends, proximate a tip of said at least one second deflectable flexible finger, beyond said primary surface of said at least one second deflectable flexible finger, and wherein said primary surface of said at least one second deflectable flexible finger is coplanar with at least a portion of said second side surface;

said foundation assembly further comprising:

a first header element, wherein said first header element comprises an elongate portion of material having a first terminating end and a second terminating end, wherein one or more recesses are formed in said first terminating end and said second terminating end of said first header element, and wherein said first header element comprises at least one groove formed in an interior side of said first header element, perpendicular to a longitudinal axis of said first header element;

a second header element, wherein said second header element comprises an elongate portion of material having a first terminating end and a second terminating end, wherein one or more recesses are formed in said first terminating end and said second terminating end of said second header element, and wherein said second header element comprises at least one groove formed in an interior side of said second header element, perpendicular to a longitudinal axis of said second header element, and wherein said first header element and said second header element are of equal length;

a first side rail element, wherein said first side rail element comprises an elongate portion of material having a first terminating end and a second terminating end, wherein one or more recesses are formed in said first terminating end and said second terminating end of said first side rail element, and wherein said first side rail element comprises at least one groove formed in an interior side of said first side rail element, perpendicular to a longitudinal axis of said first side rail element;

a second side rail element, wherein said second side rail element comprises an elongate portion of material having a first terminating end and a second terminating end, wherein one or more recesses are formed in said first terminating end and said second terminating end of said second side rail element, and wherein said second side rail element comprises at least one groove formed in an interior side of said second side rail element, perpendicular to a longitudinal axis of said second side rail element, and wherein said first side rail element and said second side rail element are of equal length;

wherein said substantially dowel-shaped protrusions extending from said first abutment surface of a first connector element are fitted within said recesses of said first terminating end of said first header element;

wherein said substantially dowel-shaped protrusions extending from said second abutment surface of a second connector element are fitted within said recesses of said second terminating end of said first header element;

wherein said substantially dowel-shaped protrusions extending from said first abutment surface of said second connector element are fitted within said recesses of first terminating end of a first side rail element;

wherein said substantially dowel-shaped protrusions extending from said second abutment surface of a third connector element are fitted within said recesses of a second terminating end of said first side rail element;

wherein said substantially dowel-shaped protrusions extending from said first abutment surface of said third connector element are fitted within said recesses of said first terminating end of said second header element;

wherein said substantially dowel-shaped protrusions extending from said second abutment surface of a forth connector element are fitted within said recesses of said second terminating end of said second header element;

wherein said substantially dowel-shaped protrusions extending from said first abutment surface of said forth connector element are fitted within said recesses of said first terminating end of said second side rail element;

wherein said substantially dowel-shaped protrusions extending from said second abutment surface of said first connector element are fitted within said recesses of said second terminating end of said second side rail element; and a deck panel secured at least partially within a recessed notch formed in each of said first header element, said second header element, said first side rail element, and said second side rail element, and within said first deck panel corner abutment surface of each connector element.

18. The foundation assembly of claim 17, wherein a tang of each connector element is positioned within a groove of one of said side rail element or said header elements.

* * * * *